United States Patent
Weber et al.

(10) Patent No.: US 8,604,661 B2
(45) Date of Patent: Dec. 10, 2013

(54) ROTOR OF AN ELECTRICAL MACHINE WITH CORD LASHING

(75) Inventors: Ralf Weber, Leinfelden-Echterdingen (DE); Michael Rader, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 12/562,614

(22) Filed: Sep. 18, 2009

(65) Prior Publication Data

US 2010/0090559 A1    Apr. 15, 2010

(30) Foreign Application Priority Data

Nov. 10, 2008 (DE) .......................... 10 2008 043 588

(51) Int. Cl.
  *H02K 3/487* (2006.01)
(52) U.S. Cl.
  USPC .......................................... 310/214; 310/215
(58) Field of Classification Search
  USPC ................................................. 310/214, 215
  See application file for complete search history.

(56) References Cited

U.S. PATENT DOCUMENTS

| | | | | | |
|---|---|---|---|---|---|
| 1,619,415 | A | * | 3/1927 | Gomory | 29/598 |
| 2,747,119 | A | * | 5/1956 | Petersen et al. | 310/270 |
| 3,631,590 | A | * | 1/1972 | Wichmann et al. | 29/596 |
| 3,991,152 | A | * | 11/1976 | Santi et al. | 264/161 |
| 4,081,776 | A | | 3/1978 | Hisamoto et al. | |
| 4,781,048 | A | * | 11/1988 | Richardson | 72/146 |
| 5,352,948 | A | * | 10/1994 | Kirn et al. | 310/214 |
| 5,449,963 | A | * | 9/1995 | Mok | 310/270 |
| 5,731,651 | A | | 3/1998 | Hyodo | |
| 6,075,303 | A | * | 6/2000 | Schuler | 310/201 |
| 6,278,213 | B1 | * | 8/2001 | Bradfield | 310/216.069 |
| 7,814,641 | B2 | * | 10/2010 | Du et al. | 29/557 |

FOREIGN PATENT DOCUMENTS

| | | | | |
|---|---|---|---|---|
| DE | 199 31 383 | | 1/2001 | |
| JP | 54036526 A | * | 3/1979 | H01F 27/32 |
| JP | 08316057 A | * | 11/1996 | H01F 27/32 |
| JP | 2005143172 A | * | 6/2005 | H02K 3/34 |

* cited by examiner

*Primary Examiner* — Tran Nguyen
*Assistant Examiner* — Naishadh Desai
(74) *Attorney, Agent, or Firm* — Michael J. Striker

(57) ABSTRACT

A rotor of an electrical machine has slots which are tapered on an inlet side, a machine winding having winding overhangs, a cord lashing which reaches over the winding overhangs, extends in the slots, and is formed by a cord, and at least one end of the cord is pressed by a filler element inserted in one of the slots in order to fix it in position in an interstice of the slot formed between the machine winding and the slot taper.

6 Claims, 4 Drawing Sheets

ROTOR OF AN ELECTRICAL MACHINE WITH CORD LASHING

CROSS-REFERENCE TO RELATED APPLICATION

The invention described and claimed hereinbelow is also described in German Patent Application DE 10 2008 043 588.0 filed on Nov. 10, 2008. This German Patent Application, whose subject matter is incorporated here by reference, provides the basis for a claim of priority of invention under 35 U.S.C. 119(a)-(d).

BACKGROUND OF THE INVENTION

The present invention relates to a rotor of an electrical machine comprising slots which are tapered on the inlet side and include a machine winding having winding overhangs, and comprising a cord lashing which reaches over the winding overhangs, extends in the slots, and is formed by a cord. The present invention also relates to a method directed to the manufacture of the cord lashing.

In the related art it is known to install a lashing in certain regions of the rotor of electrical machines for certain applications, as abrasion protection. It is known to use a polyester cord as the lashing, which is bonded in the region of the beginning and end of the cord by using heat to melt it. It is also known to manufacture lashings out of twisted thread, although the beginning and end of the cord must be knotted. It is not possible to automate careful knotting of this type; in the related art, therefore, the rotors must be removed from the production line, and the knots must be formed manually. This results in complex logistics and requires a great deal of time, and, in the least favorable cases, the quality of the knots is not consistent.

SUMMARY OF THE INVENTION

The object of the present invention is to fully automate the creation of the cord lashing in order to minimize material costs and improve the process. In particular, it should be possible to fasten the cord in position without manual intervention.

For this purpose, a rotor of an electrical machine is provided which includes slots which are tapered on the inlet side and include a machine winding having winding overhangs, and which includes a cord lashing which reaches over the winding overhangs, extends in the slots, and is formed by a cord. It is provided that at least one end of the cord is pressed by a filler element inserted in one of the slots in order to fix it in position in an interstice of the slot formed between the winding and the slot taper. Therefore, the cord is not fixed in position via knotting or welding or heat-induced bonding (melting the cord material), but rather by pressing it into the interstice formed between the winding and the tapered region of the slot.

This pressing into the interstice is carried out via the filler element which acts on at least one end of the cord, thereby pressing it into the interstice. Via the pressing into the interstice using the filler element, the end of the cord is prevented from coming out of the desired, intended installation position; the cord lashing is hereby prevented from coming loose during operation. Given that the end of the cord is wedged in the interstice using the filler element, knotting or bonding become superfluous. It is particularly advantageous that the error-prone process of knotting, in particular manual knotting, may be eliminated. Nor is it necessary to apply heat to the rotor (as is common in the related art in order to adhere the polyester cord), or to apply another chemical substance, namely the adhesive.

In a preferred embodiment, the filler element is composed of a paper material. Paper materials are available in large quantities at very favorable prices, and they may be configured for a large number of applications.

Particularly preferably, the filler element is a paper cord, in particular a paper cord that has been flattened via deformation. In this case, the paper material is formed into a cord, the dimensions of which are changed via flattening such that a filler element is formed in the manner of a "paper wedge", although the design does not actually have to be wedge-shaped; the important point is that the paper cord be flattened to form a cross section that is more flat than round.

Preferably, the width of the flattened paper cord is greater than the width of the slot inlet. As a result, it is possible to wedge the flattened paper cord in the slot in self-locking manner, so to speak. That is, it extends underneath the slot taper and automatically enters at least a section of the interstice between the machine winding and the slot taper, thereby fixing the cord installed there in position.

In a further, preferred embodiment, the filler element is shorter than the length of the slot. In order to adequately fix the end of the cord in the slot, it is not necessary to form the filler element across the entire length of the slot. It is sufficient to insert the filler element in a region of the slot, at the end of which the end of the cord is located. As a result, it is possible to very advantageously prevent the mass of the rotor from increasing unnecessarily, in particular to prevent an eccentric mass of the rotor from increasing unnecessarily.

In a further embodiment, it is provided that the cord has a beginning and an end, and that, when the cord lashing is created, the beginning is wrapped up, and the end is fixed in position using the filler element. The ends of the cord that form the cord lashing are consequently referred to as a beginning and an end; the beginning is the end of the cord that is processed at the beginning of lashing manufacture, and the end of the cord is the end that will be fixed in position at the end of lashing manufacture. The beginning of the cord is therefore not fixed in position using a filler element or using a similar aid or, e.g., via bonding, but rather by being wrapped up. This corresponds, e.g., to the handling of knotting, and is based on the idea that friction forces build up between individual parts of the rotor and between cord sections in such a manner that the cord remains in position in a self-locking manner. When the cord, namely the cord beginning, is inserted in the slots, the process takes place from one slot to another slot via a winding overhang; a structure of cord sections lying one on top of the other quickly forms, thereby preventing the cord from coming out of the slot when the friction forces are applied (because the cord is not inserted loosely, but rather under tension). It is therefore not necessary to fasten the beginning of the cord separately using a filler element or via bonding.

Furthermore, a method is proposed for fastening the end of a cord lashing—formed by a cord—of a rotor of an electrical machine, in particular for use in a rotor according to one or more of the embodiments described above. In this case, at least one end of the cord is placed in a slot of the rotor such that, after the cord has been placed in the slot tapered on the inlet side, a filler element is added in such a manner that the end is pressed into a winding space formed between the winding and the slot taper. This method allows the use of a simple cord (twisted thread) which, particularly advantageously, may be saturated with a resin after it is installed, or which, when the rotor is immersed in resin, as is known from the related art, particularly advantageously fills with resin, thereby resulting in a particularly stable and robust composite construction.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
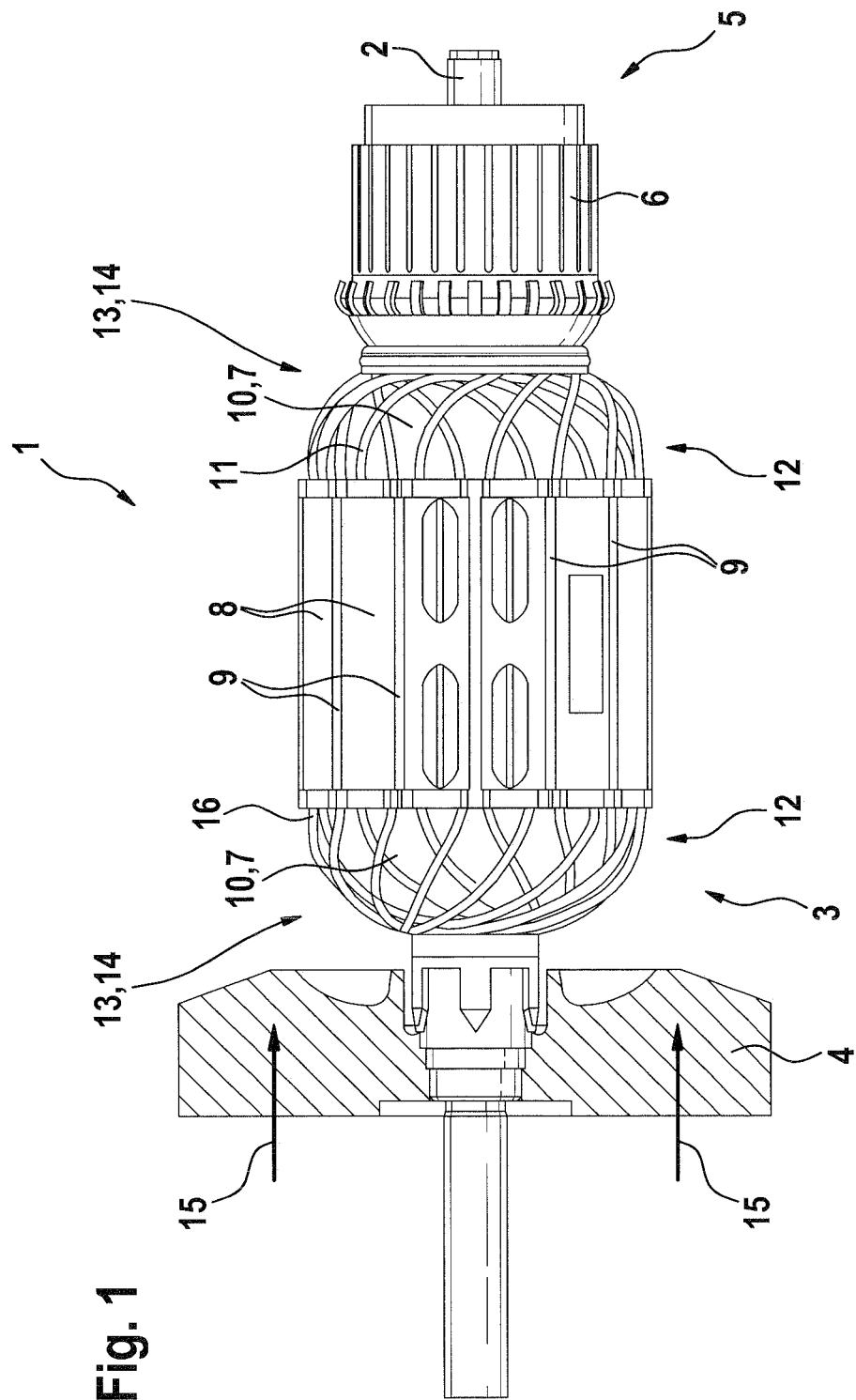
FIG. 1 shows a rotor of an electrical machine in accordance with the present invention.

FIG. 1 shows a rotor 1 for installation in an electrical machine which is not depicted. Rotor 1 is supported on a rotor shaft 2 and includes, on a first rotor end 3, a fan wheel 4 for delivering cooling air, and, on a second rotor end 5, it includes a commutator 6 which is connected in an electrically conductive manner to a machine winding 7 placed on rotor 1 in order to supply it with electrical energy in a manner known from the related art. The rotor has slots 9 in stator laminations 8, into which machine winding 7 is placed, in such a manner that the conductor which is composed of copper wire and forms winding 7 is guided in the slots in the manner of a coil in order to generate magnetic field lines, in a manner known from the related art, with the formation of winding overhangs 10. After machine winding 7 is installed, a cord 11 is inserted, starting in a slot 9, and is guided in such a manner that it reaches over winding overhangs 10 via a netlike mesh 12.

To this end, cord 11 is guided, starting from a slot 9, over a winding overhang 10 on first rotor end 3, and then, in another slot 9, it is returned to second rotor end 5 and winding overhang 10 located there, until a mesh 12 of the type shown as an example here has formed. Via mesh 12, cord 11 therefore forms a compact lashing 13, namely a cord lashing 14, on rotor 1, in particular over winding overhangs 10. Winding overhangs 10 are hereby protected very well against abrasive particles that may be delivered, e.g., in a cooling air flow 15, since, when rotor 1 rotates during operation of the electrical machine (not depicted), the particles that are delivered in cooling air flow 15, e.g., dust particles, are deflected at the highest points of winding overhangs 10 formed by mesh 12 and do not reach sensitive winding overhangs 10. Very good abrasion protection for winding overhangs 10 is provided as a result. At the same time, good mechanical fixing of machine winding 7, in particular winding overhangs 10, is attained, which may be increased further by saturating cord 11 or machine winding 7 or entire rotor 1 with a resin 16.

Figure 2:
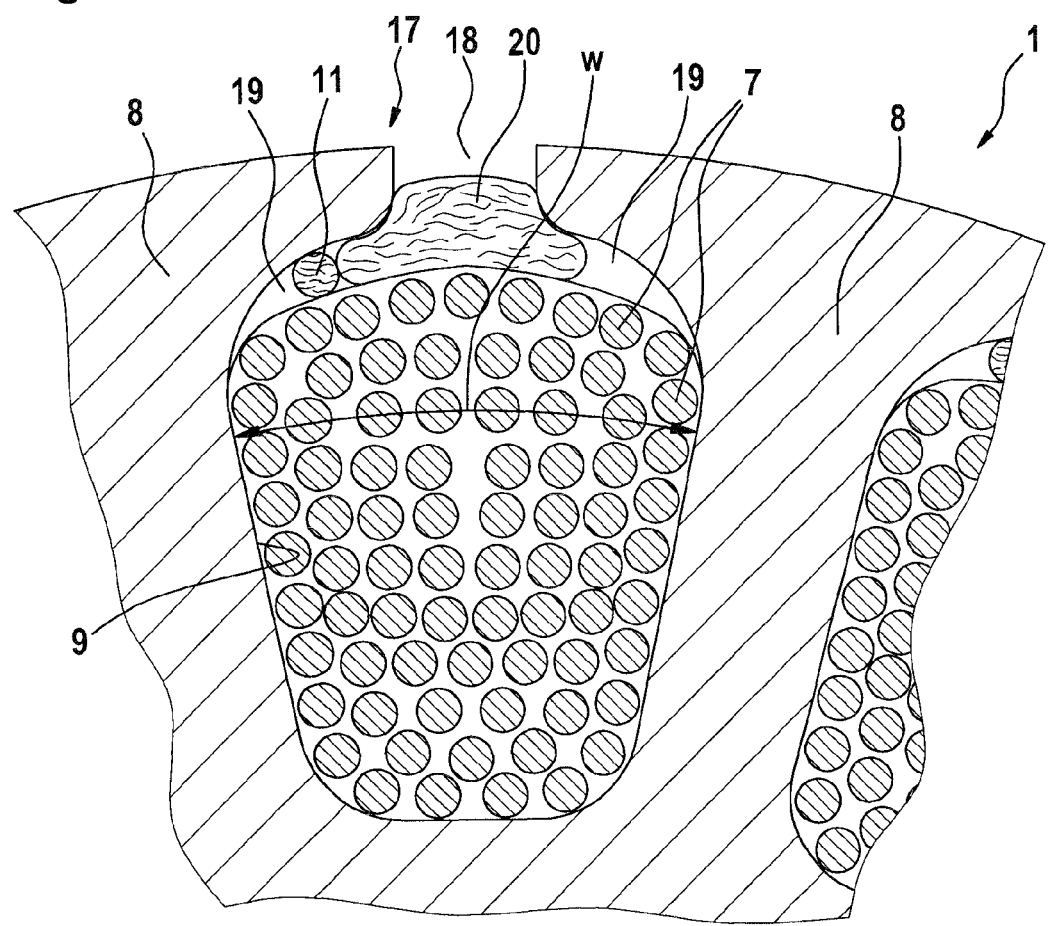
FIG. 2 shows a cross-sectional view of a section of this rotor in accordance with the present invention.

FIG. 2 shows a cross-sectional view of rotor 1 described above, including stator laminations 8, in which slots 9 are formed in the longitudinal direction. Slots 9 include a slot taper 18 on the top side, i.e., on an outer circumferential side 17 of rotor 1, i.e., a reduction in an internal width w of slot 9 through which machine winding 7 is inserted into slot 9. An interstice 19 is formed between machine winding 7 and slot taper 9, namely in a region in which, in order to form slot taper 18, the material of stator laminations 8 widens over regions of machine winding 7 in the manner of a roof, as it were. Cord 11 is placed in interstice 19 in such a manner that it is held in interstice 19 between stator lamination 8 and machine winding 7 in a clamped manner. To fix this clamped retention of cord 11, a filler element 20 is placed in slot 9 in such a manner that it is pressed into interstices 19 to the left and right of slot taper 18, underneath slot taper 18 and in contact with machine winding 7. As a result, filler element 20 holds cord 11 pressed into interstice 19, thereby preventing cord 11 from coming out of interstice 19. In this manner, a very good retention and reliable fixing of cord 11 in interstice 19 and, therefore, on rotor 1, is brought about. It is not necessary to knot cord 11 once more after lashing 13 shown in FIG. 1 is created.

Figure 3:
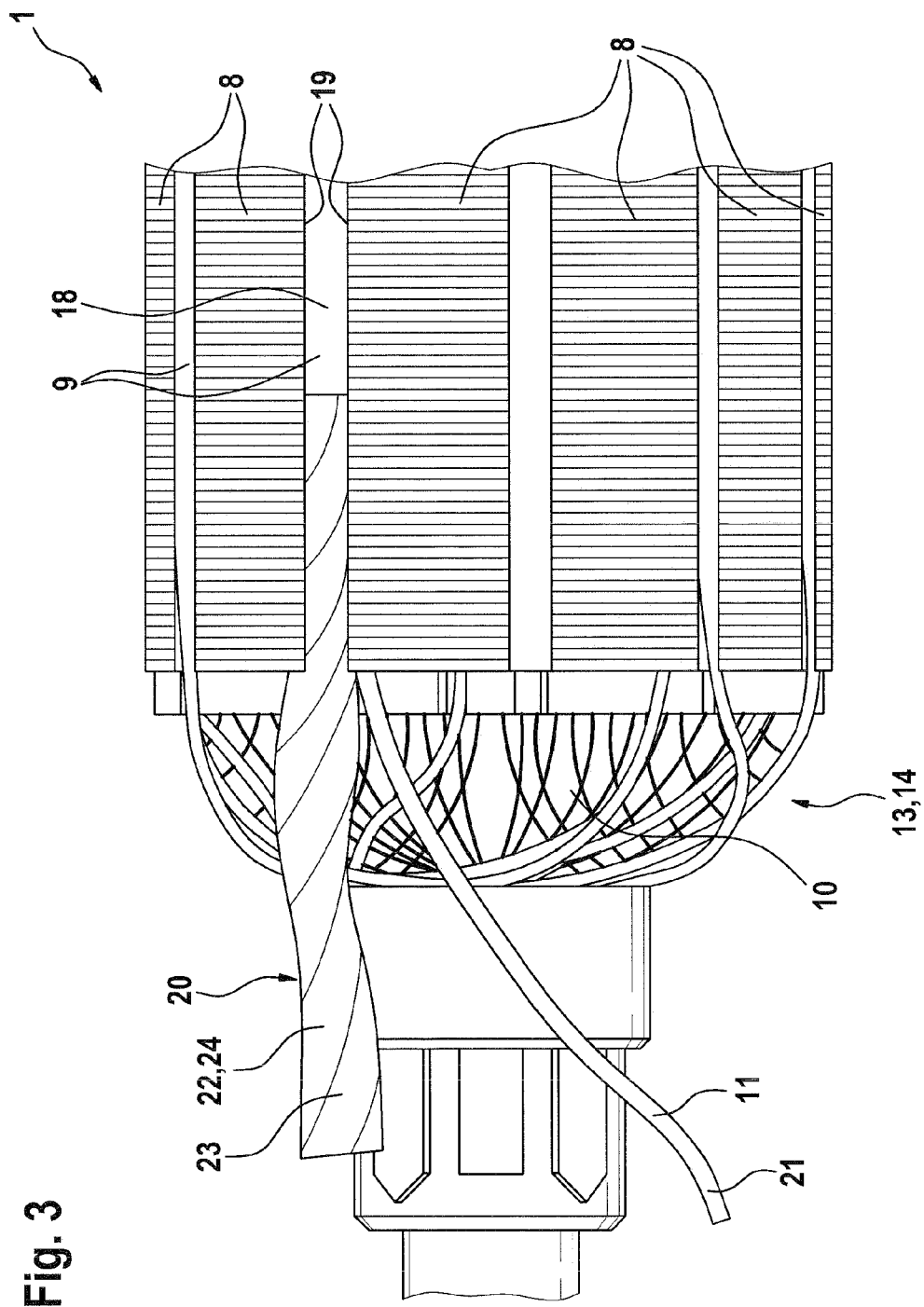
FIG. 3 shows the installation of a filler element formed of a paper cord in a slot in order to fix the filler element in position in accordance with the present invention.

FIG. 3 shows a section of rotor 1 including stator laminations 8 into which cord 11 has been placed in order to form lashing 13 over winding overhangs 10. After lashing 13 has been created, one end 21 of cord 11 is held taut, and filler element 20 is placed in slot 9, out of which end 21 of cord 11 extends after lashing 13 has been created. Filler element 20 is formed by a paper cord 22, and is therefore composed of a paper material 23. Paper cord 22 is designed as a flattened paper cord 24, i.e., having a shape in which its width is markedly greater than its thickness. It may therefore be inserted into slot tapers 18 so that it may widen under stator laminations 8 in interstices 19, and it becomes taut due to its material properties and its attempt to stretch in order to regain its original shape. Cord 11 is hereby advantageously wedged in interstice 19 via pressing.

Figure 4:
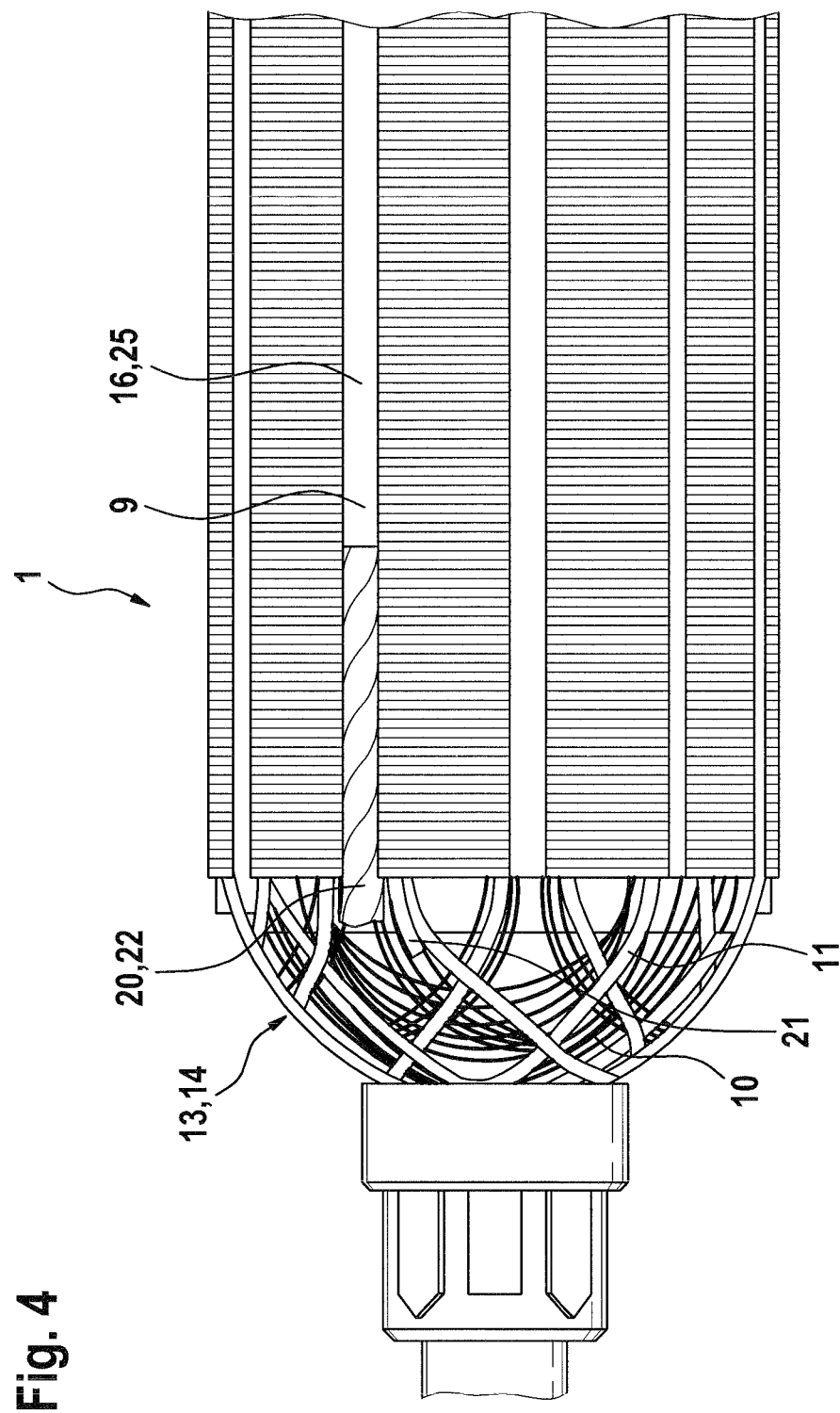
FIG. 4 shows the inventive rotor after the filler element has been added, in the finished state.

FIG. 4 shows rotor 1 in the finished state; filler element 20, which is shorter than the length of slot 9 into which it is placed, has been inserted completely and may have been trimmed off as necessary. After lashing 13 has been formed by winding cord 11 over winding overhangs 10 and fixing end 21 of cord 11 using filler element 20 which is designed as paper cord 22, rotor 1 is saturated with resin 16, namely a synthetic plastic resin 25. Cord 11 and filler element 20 each absorb a large quantity of resin 16, thereby forming a solid, highly dimensionally stable composite construction once resin 16 has dried and hardened. As a result, rotor 1 is mechanically fixed very well, in particular in the region of its winding overhangs 10, and it is protected via lashing 13 very well against, e.g., particles (dust, etc.) that are delivered via cooling air.

It will be understood that each of the elements described above, or two or more together, may also find a useful application in other types of constructions differing from the types described above.

While the invention has been illustrated and described as embodied in a rotor of an electrical machine with cord lashing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rotor of an electrical machine, comprising
   stator laminations in which a plurality of slots with internal widths are formed and which extend in a direction of a longitudinal axis of the rotor, wherein the internal widths of the slots are tapered on an inlet side to realize a reduction of the internal widths at the inlet side;

a machine winding having winding overhangs;

a cord lashing comprising a cord inserted into said slots and extending over said winding overhangs to form a netlike mesh thereon; and a filler element arranged so that at least one end of said cord is pressed by said filler element inserted in one of said slots in order to fix a position of said cord in an interstice of said one slot formed between said machine winding and a slot taper of said one slot, wherein the filler element is composed of a paper material and is shorter than a length of said one slot, wherein said cord and said filler element do not extend out of said one slot vertically above a surface of the stator laminations, and wherein said interstice is formed between said machine winding and said slot taper so that a material of said stator laminations proximate said slot taper is wider over regions of said machine winding in a manner of a roof.

2. The rotor as defined in claim 1, wherein said filler element is a paper cord.

3. The rotor as defined in claim 2, wherein said paper cord which forms said filler element is a paper cord flattened via deformation.

4. The rotor as defined in claim 3, wherein said flattened paper cord has a width that is greater than a width of a slot inlet of said one slot.

5. The rotor as defined in claim 1, wherein said cord has a beginning and an end, such that when said cord lashing is created, said beginning is wrapped up and said end is fixed in position using said filler element.

6. A method for manufacturing a rotor of an electrical machine comprising the steps of providing slots in stator laminations having internal widths in a way that the slots which are tapered on an inlet side, wherein the slots extend in a direction of a longitudinal axis of the rotor and the tapers realize a reduction in the slot widths at the inlet side;

providing a machine winding having winding overhangs;

arranging a cord lashing comprising a cord inserted in said slots so that the cord lashing reaches over the winding overhangs and forms a netlike mesh on the winding overhangs; and pressing at least one end of the cord by a filler element inserted in one of the slots in order to fix the position of the cord in an interstice of the one slot formed between the machine winding and a slot taper of the one slot so that a material of said stator laminations proximate the slot taper is wider over regions of the machine winding in a manner of a roof, wherein the filler element is composed of a paper material and is shorter than a length of said one slot.

* * * * *